(12) United States Patent
Joyner et al.

(10) Patent No.: US 11,611,473 B2
(45) Date of Patent: Mar. 21, 2023

(54) PROVISIONING A SERVICE USING FILE DISTRIBUTION TECHNOLOGY

(71) Applicant: ZixCorp Systems, Inc., Dallas, TX (US)

(72) Inventors: Bryan Adam Joyner, Sachse, TX (US); Kelly Sue Morrison, Dallas, TX (US); Dustin Stewart Silverman, Richardson, TX (US); Patrick Stephen Trantham, Sunnyvale, TX (US)

(73) Assignee: ZIXCORP SYSTEMS, INC., Dallas, TX (US)

( * ) Notice: Subject to any disclaimer, the term of this patent is extended or adjusted under 35 U.S.C. 154(b) by 0 days.

(21) Appl. No.: 16/942,202

(22) Filed: Jul. 29, 2020

(65) Prior Publication Data

US 2020/0358652 A1   Nov. 12, 2020

Related U.S. Application Data

(63) Continuation-in-part of application No. 15/896,569, filed on Feb. 14, 2018, and a continuation-in-part of
(Continued)

(51) Int. Cl.
| | |
|---|---|
| *G06F 15/16* | (2006.01) |
| *H04L 41/0806* | (2022.01) |
| *H04L 67/06* | (2022.01) |
| *H04L 41/0893* | (2022.01) |
| *H04L 41/0813* | (2022.01) |

(52) U.S. Cl.
CPC ...... *H04L 41/0806* (2013.01); *H04L 41/0813* (2013.01); *H04L 41/0893* (2013.01); *H04L 67/06* (2013.01)

(58) Field of Classification Search
None
See application file for complete search history.

(56) References Cited

U.S. PATENT DOCUMENTS

| | | |
|---|---|---|
| 6,178,443 B1 | 1/2001 | Lin |
| 8,060,624 B1 | 11/2011 | McKinney et al. |

(Continued)

FOREIGN PATENT DOCUMENTS

| | | |
|---|---|---|
| EP | 3223496 A1 | 9/2017 |
| WO | WO 2005/054989 A2 | 6/2005 |

OTHER PUBLICATIONS

Marc J. Rochkind, The Source Code Control System, 1975, IEEE Transactions on Software Engineering, vol. SE-1, No. 4, pp. 364-370.

(Continued)

*Primary Examiner* — Phyllis A Book
(74) *Attorney, Agent, or Firm* — Sprinkle IP Law Group

(57) ABSTRACT

According to certain embodiments, a provisioning manager comprises an interface and processing circuitry. The interface is configured to obtain provisioning data from a provisioning database. The processing circuitry is configured to prepare one or more configuration files based on the provisioning data and provide the one or more configuration files to the one or more service instances using file distribution technology. The one or more configuration files indicate how to provision one or more service instances used in sending or receiving electronic messages.

20 Claims, 4 Drawing Sheets

Related U.S. Application Data application No. 14/154,755, filed on Jan. 14, 2014, now Pat. No. 10,742,717.

(56) References Cited

U.S. PATENT DOCUMENTS

| | | | |
|---|---|---|---|
| 8,626,716 | B1 | 1/2014 | Katzer |
| 11,436,197 | B2 | 9/2022 | Silverman |
| 2003/0182559 | A1 | 9/2003 | Curry et al. |
| 2004/0139018 | A1 | 7/2004 | Anderson |
| 2004/0139314 | A1 | 7/2004 | Cook et al. |
| 2005/0114692 | A1 | 5/2005 | Watson-Luke |
| 2006/0018445 | A1 | 1/2006 | Mittal |
| 2006/0036463 | A1 | 2/2006 | Patrick |
| 2008/0034068 | A1* | 2/2008 | Vaughan ............... G06Q 10/10 709/223 |
| 2008/0104517 | A1 | 5/2008 | Horvitz |
| 2008/0195664 | A1 | 8/2008 | Maharajh et al. |
| 2009/0100263 | A1 | 4/2009 | Leonard |
| 2010/0299522 | A1 | 11/2010 | Khambete |
| 2011/0099558 | A1 | 4/2011 | Patrick |
| 2012/0042161 | A1 | 2/2012 | Brown et al. |
| 2012/0054497 | A1 | 3/2012 | Korhonen |
| 2012/0117385 | A1 | 5/2012 | Bryson |
| 2012/0124369 | A1 | 5/2012 | Amenedo et al. |
| 2013/0055368 | A1 | 2/2013 | Bauckman et al. |
| 2013/0173795 | A1 | 7/2013 | McPherson |
| 2013/0179982 | A1* | 7/2013 | Bridges ............... G06Q 30/0185 726/26 |
| 2013/0204948 | A1 | 8/2013 | Zeyliger et al. |
| 2014/0101775 | A1 | 4/2014 | Cheung et al. |
| 2014/0168453 | A1 | 6/2014 | Shoemake et al. |
| 2014/0208391 | A1 | 7/2014 | Farnsworth et al. |
| 2015/0088982 | A1 | 3/2015 | Johnson |
| 2015/0149585 | A1 | 5/2015 | Zhang |
| 2015/0156172 | A1 | 6/2015 | Nandi et al. |
| 2015/0269617 | A1 | 9/2015 | Mikurak |
| 2015/0372821 | A1 | 12/2015 | Deschenes et al. |
| 2016/0087933 | A1 | 3/2016 | Johnson |
| 2017/0005974 | A1 | 1/2017 | Wheeler |
| 2017/0041296 | A1 | 2/2017 | Ford |
| 2017/0085650 | A1* | 3/2017 | Mungo ................... H04L 67/53 |
| 2017/0094024 | A1* | 3/2017 | Braudes .................... G06F 8/61 |
| 2017/0222946 | A1* | 8/2017 | Ben Dayan ......... H04L 43/0882 |
| 2017/0272467 | A1 | 9/2017 | Osterweil et al. |
| 2017/0318025 | A1* | 11/2017 | McAlister ............. G06F 21/604 |
| 2017/0339130 | A1 | 11/2017 | Reddy et al. |
| 2018/0006881 | A1* | 1/2018 | Anandam ........... H04L 41/0876 |
| 2018/0007061 | A1 | 1/2018 | Liebmann |
| 2018/0285234 | A1* | 10/2018 | Degaonkar ......... G06F 11/0709 |
| 2019/0065063 | A1 | 2/2019 | Ahn |
| 2019/0158353 | A1 | 3/2019 | Johnson |
| 2019/0258781 | A1 | 8/2019 | Qureshi |
| 2019/0349426 | A1 | 11/2019 | Smith |
| 2020/0127891 | A9* | 4/2020 | Johnson ............... H04L 67/141 |
| 2022/0035770 | A1 | 2/2022 | Silverman |

OTHER PUBLICATIONS

Decision to refuse a European Patent application in Application No. 14 193 493.5-1958, dated Aug. 8, 2017, 20 pages.

European Patent Office; Summons to attend oral proceedings pursuant to Rule 115(1) EPC, dated Mar. 3, 2017.

Communication Pursuant to Article 94(3) EPC in EP Application No. 14 193 493.5-1958, dated Apr. 29, 2016, 8 pages.

European Patent Office Communication and Search Report; Application No. 14193493.5-1958; 10 pages; dated May 7, 2015.

Anonymous, "Revision control" XP055186038, retrieved from Internet: URL:http://en.wikipedia.org/w/index.php?title=Revision_control&oldid=589765566 [retrieved on Apr. 27, 2015]; Jan. 8, 2014.

Anonymous: Replication (computing)—XP055167656; retrieved from the Internet: URL:http://en.wikipedia.org/w/index.php?title=Replicaton_%28computing%29&oldid-587233222 ; [retrieved Feb. 5, 2015]; Dec. 22, 2013.

European Patent Office: Extended European Search Report issued in European Patent Application No. EP 19151705.1, dated Jun. 28, 2019.

Marc J. Rochkind, "The Source Code Control System", Dec. 1975, IEEE Transactions on Software Engineering, vol. SE-1, No. 4, pp. 364-370.

European Patent Office, Decision to Refuse a European Patent Application, issued in European Patent Application No. 14 193 493.5-1958, dated Aug. 8, 2017, 20 pages.

European Patent Office, Summons to Attend Oral Proceedings Pursuant to Rule 115(1) EPC, issued in European Patent Application No. 14193493.5-1958 / 2894598, dated Mar. 3, 2017.

European Patent Office, Communication Pursuant to Article 94(3) EPC in EP Application No. 14 193 493.5-1958, dated Apr. 29, 2016, 8 pages.

European Patent Office, Communication and Extended European Search Report, issued in European Patent Application No. 14193493.5-1958, dated May 7, 2015, 10 pages.

Anonymous, "Revision Control", XP055186038, retrieved from Internet: URL:http://en.wikipedia.org/w/index.php?title=Revision_control&oldid=589765566, retrieved on Apr. 27, 2015, dated Jan. 8, 2014.

Anonymous, "Replication (Computing)", XP055167656, retrieved from the Internet: URL:http://en.wikipedia.org/w/index.php?title=Replicaton_%28computing%29&oldid-587233222; retrieved on Feb. 5, 2015, dated Dec. 22, 2013.

European Patent Office, Communication and Extended European Search Report, issued in European Patent Application No. EP 19151705.1-1213, dated Jun. 28, 2019.

Version control, retrieved from Internet: URL:http://en.wikipedia.org/w/index.php?title=Revision_control&oldid=589765566 [retrieved on Oct. 26, 2020]; 9 pages.

Replication (computing); retrieved from the Internet: URL:http://en.wikipedia.org/w/index.php?title=Replicaton_%28computing%29&oldid-587233222 ; [retrieved Oct. 26, 2020]; 8 pages.

Message queue; retrieved from the Internet: "https://en.wikipedia.org/w/index.php?title=Message_queue&oldid=981132686"; [retrieved on Oct. 14, 2020]; 6 pages.

Publish-subscribe pattern; retrieved from the Internet: "https://en.wikipedia.org/w/index.php?title=Publish-subscribe_pattern&oldid=982569506"; [retrieved on Oct. 14, 2020]; 5 pages.

Publish/Subscribe Pattern—Realtime API Hub; retrieved from the Internet:https://realtimeapi.io/hub/publishsubscribe-pattern/; [retrieved on Oct. 14, 2020]; 5 pages.

Office Action for U.S. Appl. No. 17/080,163, dated Jul. 22, 2021, 32 pgs.

Office Action for U.S. Appl. No. 17/080,163, dated Jan. 10, 2022, 36 pgs.

Notice of Allowance for U.S. Patent No. U.S. Appl. No. 17/080,163, dated Apr. 27, 2022, 8 pgs.

\* cited by examiner

PROVISIONING A SERVICE USING FILE DISTRIBUTION TECHNOLOGY

RELATED APPLICATIONS

This application is a continuation-in-part of U.S. patent application Ser. No. 14/154,755 entitled "Electronic Content Delivery with Distributed Recipient Preference," which was filed Jan. 14, 2014 and will issue as U.S. Pat. No. 10,742,717 on Aug. 11, 2020. This application is also a continuation-in-part of U.S. patent application Ser. No. 15/896,569 entitled "Harvesting and Distributing a Certificate based on a DNS Name," which was filed Feb. 14, 2018, issued as U.S. Pat. No. 11,102,192 on Aug. 24, 2021. Each of these applications is incorporated herein by reference in its entirety.

FIELD OF THE INVENTION

Certain embodiments of the present disclosure relate, in general, to provisioning a service and, more specifically, to provisioning a service using file distribution technology.

BACKGROUND

A service may be provisioned in a computer network to configure the service for use by a user. Existing methods for provisioning a service may have some drawbacks. For example, existing methods for provisioning a service may require a service provider to manually configure certain settings. Manually configuring these settings may be inefficient and error-prone, particularly when provisioning services for many users.

SUMMARY

According to certain embodiments, a provisioning manager comprises an interface and processing circuitry. The interface is configured to obtain provisioning data from a provisioning database. The processing circuitry is configured to prepare one or more configuration files based on the provisioning data and provide the one or more configuration files to one or more service instances using file distribution technology. The one or more configuration files indicate how to provision the one or more service instances used in sending or receiving electronic messages.

According to certain embodiments, a non-transitory computer readable medium stores logic that, when executed by processing circuitry of a provisioning manager, is operable to cause the provisioning manager to perform actions comprising obtaining provisioning data from a provisioning database, preparing one or more configuration files based on the provisioning data, and providing the one or more configuration files to one or more service instances using file distribution technology. The one or more configuration files indicate how to provision the one or more service instances used in sending or receiving electronic messages.

According to certain embodiments, a method comprises obtaining provisioning data from a provisioning database, preparing one or more configuration files based on the provisioning data, and providing the one or more configuration files to one or more service instances using file distribution technology. The one or more configuration files indicate how to provision the one or more service instances used in sending or receiving electronic messages.

Certain embodiments of the above-described provisioning manager, computer readable medium, and/or method may include one or more additional features, such as any one or more of the following:

In some embodiments, providing the one or more configuration files to the one or more service instances using file distribution technology comprises initiating storing the one or more configuration files in one or more repositories. Each of the one or more repositories is configured to make at least one of the configuration files available to at least one of the service instances.

In some embodiments, preparing the one or more configuration files comprises periodically polling the provisioning database, identifying new provisioning data based on polling the provisioning database, and preparing the one or more configuration files based on the new provisioning data. The new provisioning data indicates data that has been added, removed, or changed in the provisioning database.

In some embodiments, the one or more configuration files comprise a first configuration file prepared for a first service instance of the one or more service instances.

In some embodiments, preparing the first configuration file comprises determining whether to include any additional data to assist the first service instance in applying the provisioning data, formatting the configuration file according to a format that the first service instance is able to use for provisioning, and indicating that the first configuration file applies to the first service instance of the one or more service instances.

In some embodiments, preparing the first configuration file comprises delegating to a pluggable module customized to prepare the first configuration file based on the type of service provided by the first service instance. In some embodiments, the pluggable module has knowledge about how the provisioning data is organized in the provisioning database. The pluggable module is configured to use that knowledge to obtain the provisioning data relevant to the type of service provided by the first service instance.

In some embodiments, the configuration files indicates at least one of the following types of data: an identification of one or more domains; domain mapping information; an identification of one or more clients; mail relay configuration data; and mail transport configuration data.

In some embodiments, at least one of the one or more configuration files comprises at least a portion of a policy related to at least one of: encrypting, quarantining, antivirus filtering, anti-spam filtering, archiving, or branding the electronic messages. As an example, a portion of a policy may comprise one or more rules of the policy.

According to certain embodiments, a service instance comprises an interface and processing circuitry. The interface is configured to obtaining a configuration file from a repository managed by a provisioning manager. The configuration file is obtained using a file distribution technology. The processing circuitry is configured to configure the service instance based on the configuration file.

According to certain embodiments, a non-transitory computer readable medium stores logic that, when executed by processing circuitry of a service instance, is operable to cause the service instance to perform actions comprising obtaining a configuration file from a repository managed by a provisioning manager and configuring a service instance based on the configuration file. The configuration file is obtained using a file distribution technology.

According to certain embodiments, a method comprises obtaining a configuration file from a repository managed by a provisioning manager and configuring a service instance based on the configuration file. The configuration file is obtained using a file distribution technology.

Certain embodiments of the above-described service instance, computer readable medium, and/or method may include one or more additional features, such as any one or more of the following:

Some embodiments periodically poll the repository managed by the provisioning manager, obtain an updated configuration file from the repository, and configure the service instance based on the updated configuration file.

In some embodiments, the configuration files indicates at least one of the following types of data: an identification of one or more domains; domain mapping information; an identification of one or more clients; mail relay configuration data; and mail transport configuration data.

In some embodiments, at least one of the one or more configuration files comprises at least a portion of a policy related to at least one of: encrypting, quarantining, antivirus filtering, anti-spam filtering, archiving, or branding the electronic messages. As an example, a portion of a policy may comprise one or more rules of the policy.

Some embodiments of the disclosure may provide one or more technical advantages. As an example of a technical advantage, certain embodiments may allow for efficient and accurate provisioning of a service in a computer network. For example, a provisioning manager may periodically poll a database to obtain provisioning data. The provisioning manager may use the provisioning data to prepare a configuration file. For example, the provisioning manager may compare the provisioning data obtained from the database to previous provisioning data. The provisioning manager may then arrange any provisioning data that was added, modified, or deleted in a configuration file. The configuration file arranges the provisioning data in a format that can be applied by a service instance. The provisioning manager may then store the configuration file in a repository from which one or more service instances obtain the configuration file. A service instance may periodically poll the repository to determine whether the repository contains a new or updated configuration file for that service instance. If the repository contains a new or updated configuration file for that service instance, the service instance applies the configuration indicated in the configuration file.

As another example of a technical advantage, certain embodiments may allow for faster and/or simpler provisioning a new service instance, such as when a new customer is added or a new computing system comes online. The new service instance may be configured to retrieve an initial configuration file from the repository associated with the provisioning manager. Once the initial provisioning is complete, the new service may retrieve a new or updated configuration file from the repository, which may allow for further customizing the service instance for use by the user.

As another example of a technical advantage, certain embodiments may allow for a simplified architecture for provisioning a service instance. For example, certain embodiments may implement provisioning functionality without requiring application changes other than the addition of a simple cron (e.g., a simple software utility to schedule jobs, commands, or scripts to run periodically, such as at fixed times, dates, or intervals). The simplified architecture can be applied to legacy systems that have life cycles that are rigid or difficult to change.

As another example of a technical advantage, certain embodiments may allow for a distributed and flexible solution. For example, a provisioning manager can run anywhere. Similarly, service instances can run anywhere. The relationship between a provisioning manager and tenants (or service instances) can be one-to-one, one-to-many, or many-to-many.

As another example of a technical advantage, certain embodiments may allow for implementing a provisioning solution using resilient, proven technologies, such as file distribution technologies.

Some embodiments may benefit from some, none, or all of these advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Embodiments of the present invention are described in FIGS. 1-4 of the drawings, like numerals being used for like and corresponding parts of the various drawings.

Figure 1:
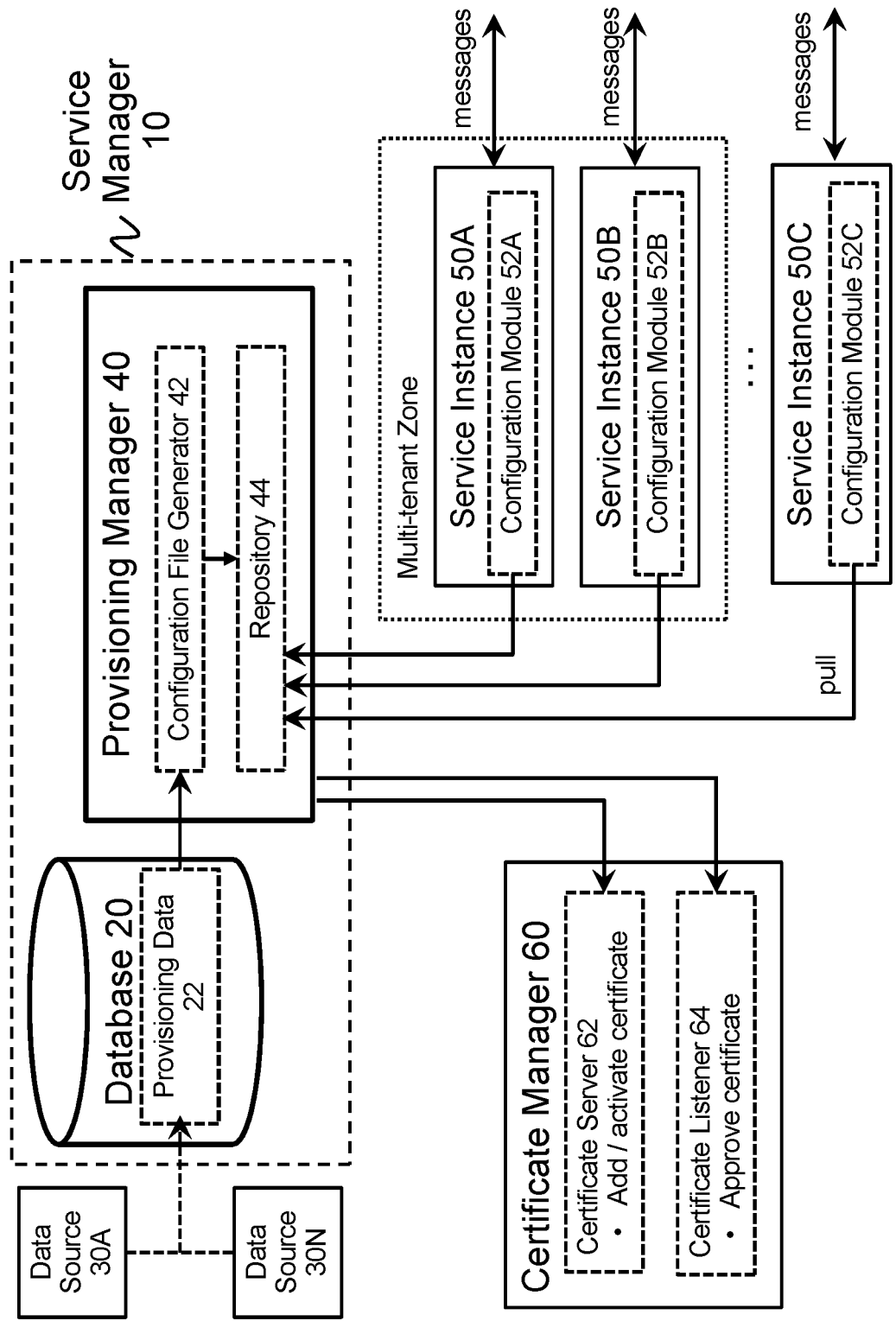
FIG. 1 illustrates an example of a system for provisioning a service instance, according to certain embodiments.

FIG. 1 illustrates an example of a system for provisioning a service instance, according to certain embodiments. The system illustrated in FIG. 1 includes a service manager 10, a database 20, data sources 30A-30N, a provisioning manager 40, a plurality of service instances 50A-50N, and a certificate manager 60. In certain embodiments, components of the system communicate via one or more networks. Examples of networks may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

In general, service manager 10 manages services provided to users. In certain embodiments, service manager 10 may comprise database 20 and provisioning manager 40 to facilitate provisioning the services. Optionally, service manager 10 may include other components to facilitate managing other aspects of the services, such as components for handling user traffic, monitoring and managing system performance, determining whether maintenance is required, determining service utilization (e.g., for network planning or billing purposes), and/or providing other suitable functionality. Each component of service manager 10 may be communicatively coupled to one or more other components of service manager 10 in any suitable manner. As an example, database 20 and provisioning manager 40 may run on the same device, may be directly connected (e.g., via a cable), or may be connected through one or more networks.

Database 20 comprises provisioning data 22. Provisioning data 22 may be used to provision one or more service instances 50. Thus, provisioning data 22 may comprise any suitable identifiers to facilitate identifying which provisioning data 22 corresponds to a particular service instance 50. In some embodiments, database 20 may be a relational database that organizes items of provisioning data 22 based on relationships to other items of provisioning data 22. As an example, a relational database may indicate a relationship between items of provisioning data 22 that are associated with the same enterprise. An enterprise may generally refer to a group of users configured to have at least some provisioning data 22 in common. As an example, an enterprise may be a company and the users may be employees of the company. Service instances 50 configured for these employees may have at least company-specific provisioning data 22 in common. In certain embodiments, the enterprise may be a customer of a service being offered by a service provider. As an example, an email service provider may host email services for a number of enterprise customers and/or a number of customers that are individual users.

In certain embodiments, database 20 receives provisioning data 22 from one or more data sources 30A, 30B, . . . 30N. In certain embodiments, a data source 30 may comprise a provisioning management application. The provisioning management application may collect information from one or more users and/or from one or more other systems, generate provisioning data 22 based on the information collected, and input the provisioning data 22 to database 20. Different data sources 30 may run different provisioning management applications, for example, to collect information from different types of users or different types of systems. To collect the information from a user, each provisioning management application may provide a user interface. Depending on the implementation and the type of provisioning data 22 being generated, at least some of the information may be collected from one or more of the following types of users via a respective user interface: a system operator, a service provider, a system administrator for an enterprise (such as a customer of a service), or an end user (e.g., user associated with a particular email account/mailbox).

Access to the provisioning management application may be controlled using authentication factors, such as confirming a username and password of the user. Different users may be granted different levels of access and/or different levels of priority. As an example, a service provider may have access to provisioning data 22 for all of the enterprises that are customers of the service provider, a system administrator for a particular enterprise may have access to provisioning data 22 for all of the email accounts/mailboxes associated with that particular enterprise (but would not have access to provisioning data 22 of other enterprises), and an end user may only have access to provisioning data 22 specific to the end user's own email account/mailbox. To the extent that provisioning data 22 from one user may conflict with provisioning data 22 from another user, the provisioning management application may apply prioritization rules to resolve the conflict.

The provisioning management application of a data source 30 may provide the user with any suitable user interface. Certain embodiments implement the user interface as a fat client on a desktop. Certain embodiments implement the user interface as a web application. As an example, the provisioning management application may comprise one or more hosted services portals (HSPs) configured to collect information from the user according to an HTTP protocol. In certain embodiments, a web service provides the backend for the web application. The web service facilitates serving the user interface at the front end and/or managing interactions between components of the system over one or more interconnecting networks. As an example, the web service may be implemented as a REST API that is used by a Javascript, Ruby on Rails, Java JSP/Servlets or other management user interface. The web service may be implemented using any suitable computing model. For example, the web service may comprise a hosted, cloud-based, or software-as-a-service (SaaS) model provided using a data center, server, or other suitable hardware. In other embodiments, the web service may be replaced or augmented by another application that performs some or all of the functionality of the web service.

As mentioned above, the provisioning management application may collect information from one or more users and/or from one or more other systems. Examples of such systems include a Customer Relationship Management (CRM) system or a system that automates aspects of provisioning, for example, based on machine learning. In one embodiment, one of the data sources (e.g., data source 30A) may include a CRM system, such as a NetSuite CRM system managed by a service provider, and another one of the data sources (e.g., data source 30B) may include a customer-facing user interface. Suppose a customer purchases a service, such as an encryption service, an anti-virus service, an anti-spam service, etc. In response, the CRM system feeds provisioning data 22 to database 20 that allows the purchased service to be activated for the customer. At a later time (e.g., after the initial provisioning has been activated), a system administrator employed by the customer could login to the customer-facing user interface and add customer-specific policies for the service.

In certain embodiments, the information collected by the provisioning management application of data source 30 may comprise at least a portion of one or more policies (e.g., the information may comprise one or more rules of a policy or an entire policy). Policies may be developed manually, automatically (e.g., using machine learning), or both (e.g., a user provides initial policy information, machine learning updates the policy information, the user can review/override the policy information). Examples of policies for email may include encrypting, filtering, archiving, and/or branding policies. These policies may indicate content and/or metadata to be reviewed for an email or email attachment and actions to perform if the content and/or metadata matches or fails to match keywords or characteristics defined by the policy.

For example, an encryption policy may indicate which emails require encryption, a type of encryption to be applied, an encryption key to be used, and/or other encryption-related rules. A filter policy may indicate which emails require filtering, which filter(s) to apply (e.g., antivirus, anti-spam), which actions to take (e.g., quarantine the email, discard the email after a certain period of inaction, perform a malware scan and attempt to remediate the email, etc.), and/or other filter-related rules. An archiving policy may indicate which emails require archiving, where and/or for how long to store an email (e.g., so that an important email can be accessed from a database or file management system in the future), and/or other archiving-related rules. A branding policy may indicate which emails require branding, which branding to use, such as a business logo or trade dress, a designation (e.g., "confidential," "proprietary," "draft"), a watermark (e.g., recipient's name, date, or other metadata), etc., and/or other branding-related rules.

In general, provisioning manager 40 facilitates provisioning one or more service instances 50. In certain embodiments, provisioning manager 40 includes a configuration file generator 42 and a repository 44. Configuration file generator 42 obtains provisioning data 22 from database 20. As an example, configuration file generator 42 may periodically poll database 20 to determine whether any provisioning data 22 has been added, modified, or removed compared to previous provisioning data 22. Polling may be performed at a pre-determined periodicity, such as every X time units (where X may be 1, 2, 5, 10, 15, 20, 30, 45, 60, or other suitable number and the time units may be seconds, minutes, hours, or other suitable time unit). Optionally, polling may be performed in response to the occurrence of a pre-determined event, such as in response to determining that an error has occurred (e.g., based on messaging received from another component or based on information indicated in a log file). Configuration file generator 42 may then prepare a configuration file based on provisioning data 22 that has been added, modified, or removed. Examples of preparing a configuration file include creating a new configuration file or updating an existing configuration file. The configuration file indicates how to provision one or more service instances 50 to send or receive electronic messages.

Configuration file generator 42 facilitates providing the configuration file to the one or more service instances 50. In certain embodiments, configuration file generator 42 stores configuration files in repository 44 from which the one or more service instances 50 obtain the configuration file, for example, using file distribution technology. Examples of file distribution technology include source code or version control repositories, such as Git, J/Git, Concurrent Version System (CVS), Subversion (SVN), Mercurial, Team Foundation version control or source control (TFS), Clearcase, or Source safe. Examples of file distribution technology further include object stores, such as Ceph or Simple Storage Service (S3).

The system may include any suitable number of service instances 50, such as service instance 50A, 50B, . . . 50N. In general, a service instance 50 comprises software that can be configured using one or more configuration files (e.g., one or more plain text files). As an example, a service instance 50 may comprise an email application or a feature of the email application, such as an encryption policy, an antivirus filter, an anti-spam filter, etc.

A service instance 50 may include (or may communicate with) a configuration module 52 that configures service instance 50 based on one or more configuration files. Configuration module 52 obtains a configuration file from repository 42. For example, configuration module 52A periodically polls repository 42 to determine whether repository 42 contains a new or updated configuration file for service instance 50A. Polling may be performed at a pre-determined periodicity, such as every X time units (where X may be 1, 2, 5, 10, 15, 20, 30, 45, 60, or other suitable number and the time units may be seconds, minutes, hours, or other suitable time unit). Optionally, polling may be performed in response to the occurrence of a pre-determined event, such as in response to determining that an error has occurred (e.g., problems sending one or more emails, receiving an error message from another component, etc.). If repository 42 contains a new or updated configuration file for service instance 50A, configuration module 52A pulls the configuration file and applies the configuration file to service instance 50A.

Continuing with the example in which service instance 50A provides an email application, the configuration file may include information for provisioning email, such as an identification of one or more domains (e.g., the names or addresses of realms within a network, such as the names or addresses of computer systems associated with a particular enterprise within the Internet), domain mapping information (e.g., domain to hostname mappings for downstream email routing), an identification of one or more clients (e.g., email readers or mail user agents (MUA) comprising computer programs used to access and manage a user's email), mail relay configuration data (e.g., domains allowed to send emails through service instance 50A or through a gateway running service instance 50A), mail transport configuration data (e.g., transport layer security (TLS) keys, TLS domain overrides), identification of enterprise codecs (e.g., computer programs that encode or decode data), identifiers needed to associate logs or reporting data with an enterprise, email policy data for an enterprise (e.g., email patterns to match, actions to perform on matched email with necessary data such as branding text, routing rules, encryption rules, encryption keys, etc.), and/or other suitable information. In certain embodiments, the email application may send and/or receive messages according to Simple Mail Transfer Protocol (SMTP).

Service instances 50 may be configured in multi-tenant implementations (as illustrated by service instances 50A and 50B) or single-tenant implementations (as illustrated by service instance 50N). Certain embodiments of multi-tenant service instances 50 run on the same gateway. The gateway hosts email services and can process email for multiple enterprises so that each enterprise does not require its own on-site gateway. Configuration files can be customized to different service instances 50 running on the same gateway. For example, a first service instance 50 running on the gateway may be configured with an encryption policy for a first enterprise, and a second service instance 50 running on the gateway may be configured with a different encryption policy for a second enterprise.

Certain embodiments include a certificate manager 60. Certificate manger 60 manages certificates that service instances 50 may use to encrypt or decrypt messages, provide TLS, etc. Certificate manager 60 comprises a certificate server 62 configured to add certificates and activate certificates. Certificate manager 60 also comprises a certificate listener 64 configured to approve certificates.

Although FIG. 1 illustrates one arrangement of components, other embodiments may include more, fewer, or different components configured to perform the operations described herein, and the components may be integrated or separate in any suitable manner. As an example, the system may include additional components, such as components to support additional traffic, facilitate load balancing, or provide backup in case one of the components requires maintenance or experiences a failure. Although the previous description describes pulling configuration files from repository 44 of provisioning manager 40 to configuration module 52 of service instance 50, other embodiments may push the configuration files from provisioning manager 40 to service instance 50. For example, each service instance 50 could expose an interface configured to accept configuration files.

The system described in FIG. 1 may be implemented using any suitable file distribution technology. In one example, the system described in FIG. 1 may be implemented using Git technology. For example, provisioning manager 40 may be located offsite (as opposed to at a user's premises) and may be used to manage clients, domains, and policies via a management user interface that stores its data in a relational database (e.g., database 20 comprising provisioning data 22, such as data for provisioning a policy). Provisioning manager 40 periodically polls database 20 to determine any changes to provisioning data 22, such as any additions, removals, or updates of domains, clients, encryption policies, etc. If provisioning data 22 has changed, provisioning manager 40 will prepare (e.g., create or update) a configuration file indicating the change, and provisioning manger 40 will then commit the configuration file to the Git repository.

As an example, if the provisioning data 22 that has changed comprises policy data, provisioning manager 40 will prepare a configuration file that includes client-specific policies for the client and commit the configuration file to the Git repository. As another example, if the provisioning data 22 that has changed indicates that a new domain has been added or removed, provisioning manager 40 will prepare a configuration file that updates the domain-to-client mapping and commit the configuration file to the Git repository. Provisioning manager 40 may also update related transport information (e.g., postfix transport file), whether in the same configuration file or a separate configuration file. As another example, if the provisioning data 22 that has changed indicates that a client has been removed, provisioning manager 40 will prepare one or more configuration files that remove policies specific to the client, update the domain-to-client mapping, and update related transport information. Provisioning manager 40 will then commit the one or more configuration files to the Git repository.

In certain embodiments, the directory structure of the Git repository may match the expected directory structure of service instance 50. Service instance 50 may run a background task that periodically executes a pull request on the Git repository. This will propagate changes made by provisioning manager 40 down to the corresponding service instance 50.

Figure 2:
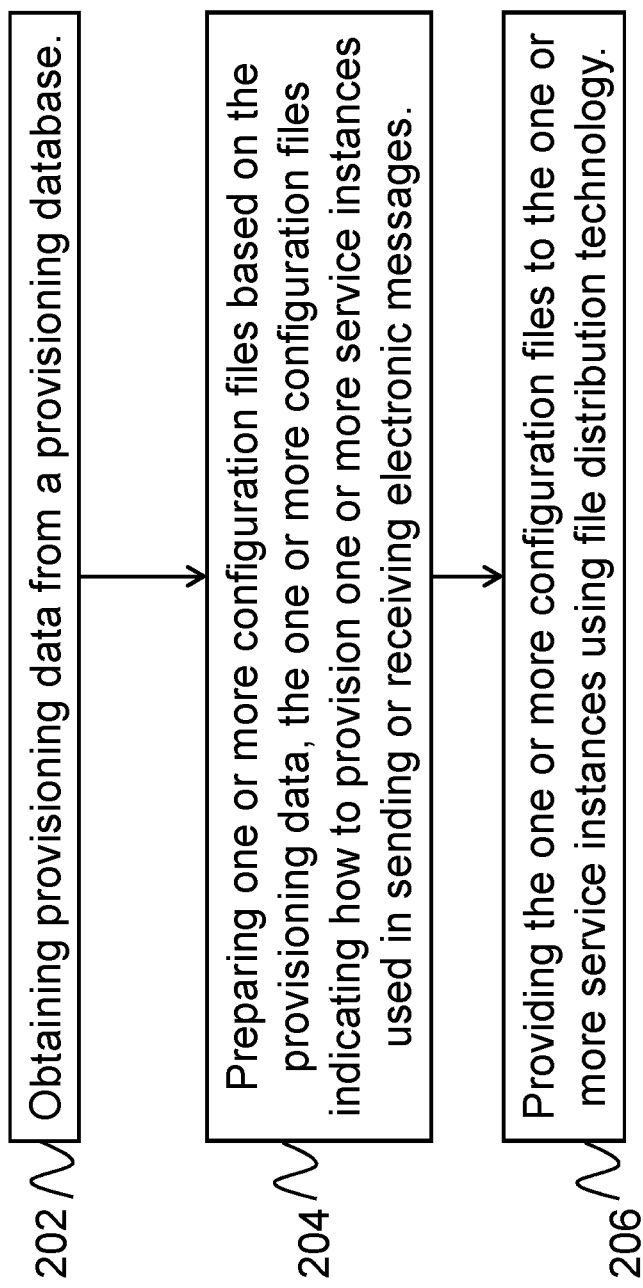
FIG. 2 illustrates an example of a method that may be performed by a provisioning manager, according to certain embodiments.

FIG. 2 illustrates an example of a method that may be performed by a provisioning manager, such as provisioning manager 40 of FIG. 1, according to certain embodiments. The method shown in FIG. 2 begins at step 202 with provisioning manager 40 obtaining provisioning data 22 from provisioning database 20. For example, provisioning manager 40 may periodically poll the provisioning database 20 to identify new provisioning data 22. In certain embodiments, the new provisioning data 22 includes provisioning data 22 that has been added, removed, or changed in the provisioning database 20 compared to previous provisioning data. If provisioning manager 40 does not possess previous provisioning data (such as when provisioning manager 40 is first initialized), the new provisioning data 22 may include all of the provisioning data 22 from provisioning database 20.

At step 204, provisioning manager 40 prepares one or more configuration files based on the provisioning data 22 obtained in step 202. A configuration file indicates how to provision one or more service instances 50 to provide a service. As an example, to provision an email service, the configuration file indicates how to provision one or more service instances 50 used in sending or receiving electronic messages. Preparing a configuration may comprise creating a new configuration file or updating an existing configuration file. Preparing the configuration file may comprise one or more of the following:

Determining which provisioning data 22 to provide to a service instance 50. For example, provisioning manager 40 may determine which provisioning data 22 both corresponds to service instance 50 and is new/changed.

Determining whether to include any additional data to assist the service instance 50 in applying the provisioning data 22. In certain embodiments, the additional data provides context for the new provisioning data 22. As an example, provisioning manager 40 may include additional data indicating downstream configurations that may be affected by the new provisioning data 22.

Formatting the configuration file according to a format that the service instance 50 is able to use for provisioning. As an example, provisioning manager 40 may have knowledge of a directory structure used by service instance 50 and may format the configuration file according to the directory structure. As another example, provisioning manager 40 may have knowledge of a file structure used by service instance 50 and may format the configuration file according to the file structure. For example, if service instance 50 uses a table structure with rows and columns arranged in a particular order, provisioning manager 40 may prepare the configuration file to provide the table with the rows and columns arranged in the proper order.

Indicating one or more service instances 50 to which the configuration file applies. For example, the configuration file may include an identifier associated with a service instance 50 to which the configuration file applies. The identifier may be included as the content of the configuration file itself or as metadata. In some embodiments, the configuration file may be stored in a location within repository 44 that is specific to a particular service instance 50 in order to indicate that the configuration file applies to that service instance 50.

Provisioning manager 40 may use any suitable techniques for preparing the configuration file. In certain embodiments, provisioning manager 40 has knowledge about information to include in the configuration file and how to format the information so that the configuration file can be used by a specific service instance 50. Examples of ways to prepare configuration files include:

Expanding an existing configuration file using a configuration file template. The configuration file template may be customized for a specific type of service instance 50. For example, a template for a service instance 50 that executes an email application may include fields for identification of one or more domains, domain mapping information, an identification of one or more clients, mail relay configuration data, mail transport configuration data, identification of enterprise codecs, identifiers needed to associate logs or reporting data with an enterprise, email policy data, antivirus filter data, anti-spam filter data, and/or other suitable information.

Creating a name-value pair mapping for an application where the names are configuration variables required by the service instance, such as hostnames for upstream or downstream services, database credentials, connection pool parameters, etc.

Creating a yaml, json, or xml file with provisioning data for a service instance.

In certain embodiments, provisioning manager 40 can delegate preparation of the configuration file to one or more pluggable modules specific to the service instance 50 (such as pluggable modules that can prepare configuration files for specific applications executed by the service instance). In certain embodiments, the pluggable modules may have knowledge about how provisioning data 22 is organized in database 20 and may use this knowledge to facilitate retrieving provisioning data 22 from database 20. For example, the pluggable modules may use a relational table that facilitates navigating a relational database.

In certain embodiments, provisioning manager 40 has at least one pluggable module for each type of configuration file that provisioning manager 40 needs to prepare. Each enterprise could be assigned one or more services. Examples of services may include an email exchange service provided by a multi-tenant gateway, an email exchange service provided by a single-tenant gateway, a data loss prevention service provided by a DLP appliance, an email blocking service provided by a security appliance, or other types of hosted services. The service maps to a set of configuration files for the service instances 50. Provisioning data 22 would be segregated appropriately in database 22 such that provisioning manager 40 would obtain provisioning data 22 specific to the service instance 50 for which the associated configuration file is being prepared.

At step 206, provisioning manager 40 provides the one or more configuration files to the one or more service instances 50. Provisioning manager 40 uses file distribution technology to provide the one or more configuration files. For example, provisioning manager 40 may initiate storing the one or more configuration files in one or more repositories, each of the one or more repositories configured to make at least one of the one or more configuration files available to at least one of the one or more service instances 50. As an example, to initiate storing the one or more configuration files, provisioning manager 40 may send a message indicating to store the one or more configuration files in the one or more repositories. Examples of repositories include source code control repositories, version control repositories, and object stores used in file distribution technology.

In certain embodiments, at least one of the repositories enables each of the one or more service instances 50 to pull any of the one or more configuration files that correspond to that service instance 50. FIG. 1 illustrates an example in which repository 44 is associated with provisioning manager 40 and each service instance 50 can pull its respective configuration file(s) from repository 44. As described above, provisioning manager 40 indicates a service instance 50 to which the configuration file applies, for example, by including an identifier associated with the particular service instance 50 as content of the configuration file or as metadata, or by storing the configuration file in a particular location within repository 44 that is specific to the particular service instance 50. In addition, or in the alternative, certain embodiments configure one or more repositories such that each repository is associated with a respective service instance 50. Such embodiments enable each of the one or more configuration files to be pushed to any of the one or more service instances 50 that correspond to that configuration file (e.g., the configuration files are pushed to the one or more repositories that map to the applicable service instance(s) 50).

Provisioning manager 40 may repeat the steps of FIG. 2 in order to update the configuration files. Suppose that provisioning manager 40 has previously prepared a first configuration file for a first service instance 50A. As an example, the first configuration file may be based on provisioning data 22 that originates from a first data source 30A (such as a CRM) and that provisioning manager 40 receives from database 20. After distributing the first configuration file to the first service instance 50A (e.g., by committing the first configuration file to repository 44), provisioning manager 40 may periodically poll database 20 to obtain updated provisioning data 22 associated with the first service instance 50A. In some embodiments, the updated provisioning data 22 originates from a second data source 30B (such as a system administrator of an enterprise running service instance 50A). Provisioning manager 40 prepares a second configuration file (either an update to or a replacement for the first configuration file) based on the updated provisioning data 22 and provides the second configuration file to the first service instance 50A using the file distribution technology.

Figure 3:
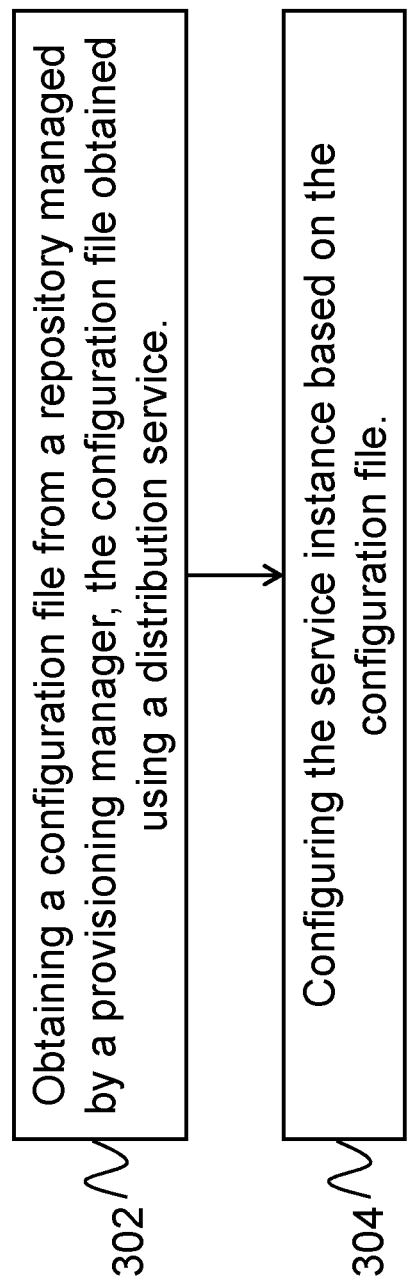
FIG. 3 illustrates an example of a method that may be performed by a service instance, according to certain embodiments.

FIG. 3 illustrates an example of a method that may be performed by a service instance, such as service instance 50 of FIG. 1, according to certain embodiments. At step 302, service instance 50 obtains a configuration file from a repository 44 managed by a provisioning manager 40. Certain embodiments obtain the configuration file using file distribution technology, such as such as Git, J/Git, CVS, SVN, Mercurial, TFS, Clearcase, Source safe, Ceph, S3, etc. As an example, service instance 50 may be configured with the location (e.g., address) of repository 44 and with an identifier specific to service instance 50. Service instance 50 may then periodically access repository 44 via cron job, a Git pull, by mounting a remote file system, or by other suitable methods in order to pull configuration files associated with the identifier specific to service instance 50. Examples of configuration files that may be retrieved from the repository are described above with respect to FIGS. 1-2.

At step 304, service instance 50 is configured based on the configuration file obtained in step 302. As an example, if the configuration file includes a policy with rules for applying encryption to email, service instance 50 may encrypt emails according to the rules of the policy.

Figure 4:
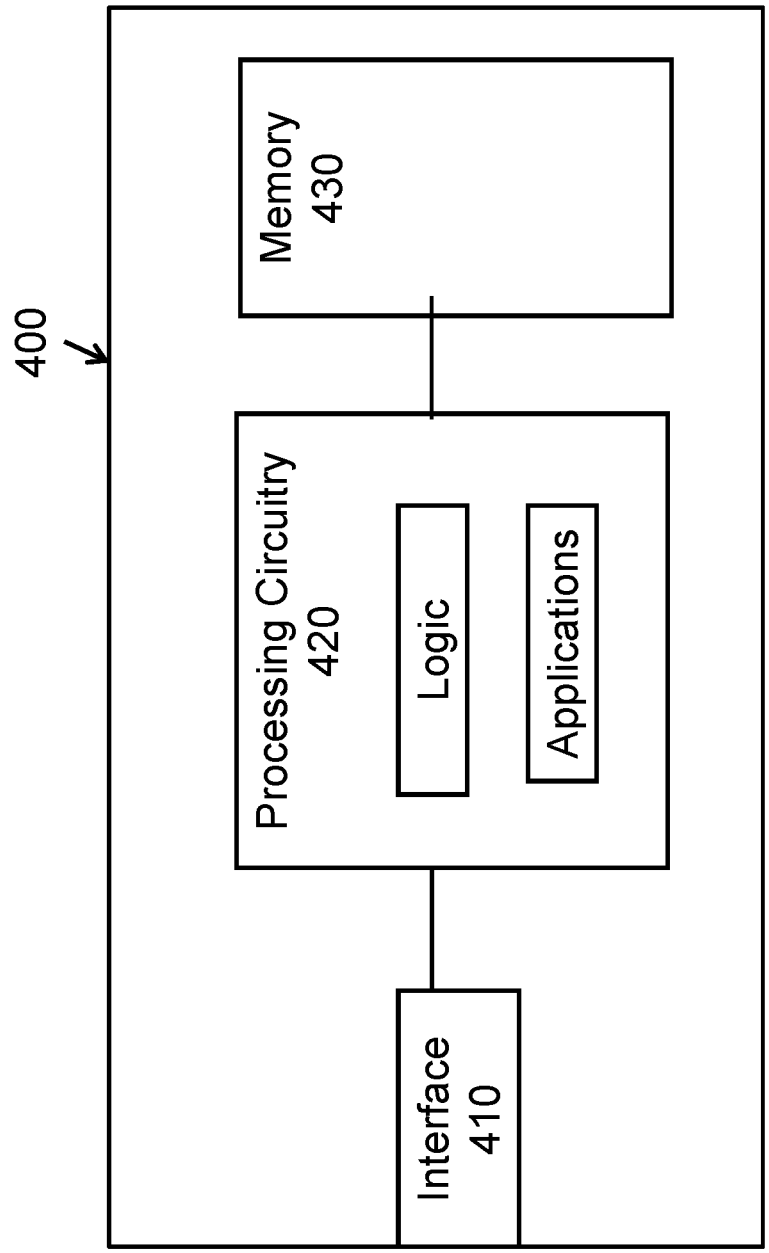
FIG. 4 illustrates an example of computing components that may be used to implement the system described in FIG. 1, or any portion thereof, such as the provisioning manager or the service instance, according to certain embodiments.

FIG. 4 illustrates an example of computing components that may be used to implement the system described in FIG. 1, or any portion thereof, such as service manager 10, database 20, data source 30, provisioning manager 40, service instance 50, or certificate manager 60, according to certain embodiments. The computing components include one or more interface(s) 410, processing circuitry 420, memory(ies) 430, and/or other suitable element(s). Interface 410 receives input, sends output, processes the input and/or output, and/or performs other suitable operation. Interface 410 may comprise hardware and/or software.

Processing circuitry 420 performs or manages the operations of the component. Processing circuitry 420 may include hardware and/or software. Examples of a processing circuitry include one or more computers, one or more microprocessors, one or more applications, etc. In certain embodiments, processing circuitry 420 executes logic (e.g., instructions) to perform actions (e.g., operations), such as generating output from input. The logic executed by processing circuitry 420 may be encoded in one or more tangible, non-transitory computer readable media (such as memory 430). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 430 (or memory unit) stores information. Memory 430 may comprise one or more non-transitory, tangible, computer-readable, and/or computer-executable storage media. Examples of memory 430 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Certain embodiments of the present disclosure use file distribution technology. Traditionally, file distribution technology has been used to provide version management for software. For example, suppose members of a team of software developers are working on the same software module. A first team member may retrieve the software module from a repository, modify the software module, and save the modified software module in the repository. Another team member may retrieve the modified software module from the repository and resume work from where the first team member stopped.

Embodiments of the present disclosure differ from traditional uses of file distribution technology. Certain embodiments of the present disclosure use file distribution technology to facilitate provisioning a service. For example, certain embodiments use file distribution technology to commit a configuration file to a repository from which one or more service instances obtain the configuration file. The configuration provides provisioning information. Prior to committing the configuration file to the repository, certain embodiments prepare the configuration file, for example, by performing one or more of: obtaining provisioning data, determining which provisioning data to provide to a service instance, determining whether to include any additional data to assist the service instance in applying the provisioning data, formatting the configuration file according to a format that the service instance is able to use for provisioning, and/or indicating one or more service instances to which the configuration file applies.

Embodiments of the present disclosure may provide certain advantages. In some embodiments, a provisioning manager 40 may apply provisioning data 22 to a configuration file template or set of templates to facilitate formatting the provisioning data 22 in a manner that can be used by a service instance 50. In certain embodiments, a service instance 50 may be provisioned independently of other services instances 50. For example, a first service instance 50 need not know about the other service instances 50 and need not apply the same provisioning as the other service instances 50. Certain embodiments configure provisioning manager 40 in a cloud or data center such that provisioning manager 40 can manage configuration files for many service instances 50 (whether in a single tenant or multi-tenant environment). The provisioning can be applied to a variety of different types of service instances (e.g., provisioning can be applied to any software that is configurable with a configuration file). Certain embodiments may use a plurality of provisioning managers 40. For example, each provisioning manger 40 may manage a subset of service instances 50. The service instances 50 may be allocated among provisioning managers 40 in any suitable manner (e.g., geographical proximity, network performance (e.g., provisioning manager 40 that can be reached with high reliability or low delay), association with a particular enterprise, type of service instance—such as one provisioning manager to provision antivirus filters and another provisioning manager to provision antispam filters, or other suitable allocation).

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A provisioning manager, comprising:
an interface configured to obtain provisioning data from a provisioning database; and
processing circuitry configured to:
prepare one or more configuration files based on the provisioning data, the one or more configuration files indicating how to provision one or more service instances that comprise an electronic mail (email) application,
wherein the one or more service instances correspond to one or more services,
wherein the provisioning data comprises:
a first policy for email communications by a first enterprise, the first policy including an encryption policy regarding encryption of electronic mail messages, and
a second policy for email communications by a second enterprise,
wherein:
a first configuration file is adapted to provision a first service instance that is associated with the first enterprise according to the first policy, and
a second configuration file is adapted to provision a second service instance that is associated with the second enterprise according to the second policy; and
provide the one or more configuration files to the one or more service instances via file distribution technology using a version control repository, wherein:
the first service instance that is associated with the first enterprise is configured to be provisioned, using the provided first configuration file, with the first policy associated with the first enterprise to implement the first policy associated with the first enterprise in association with providing a first service that corresponds to the first service instance, and
the second service instance that is associated with the second enterprise is configured to be provisioned, using the provided second configuration file, with the second policy associated with the second enterprise to implement the second policy associated with the second enterprise in association with providing a second service that corresponds to the second service instance,
wherein preparing the one or more configuration files includes identifying new provisioning data based on a periodic polling of the provisioning database, the periodic polling including comparing current provisioning data obtained from the provisioning database to previous provisioning data, to periodically determine added, deleted, or modified provisioning data.

2. The provisioning manager of claim 1, wherein to provide the one or more configuration files to the one or more service instances using file distribution technology, the processing circuitry is configured to:
   initiate storing the one or more configuration files in one or more repositories, each of the one or more repositories configured to make at least one of the one or more configuration files available to at least one of the one or more service instances.

3. The provisioning manager of claim 1, wherein to prepare the one or more configuration files, the processing circuitry is further configured to:
   periodically poll the provisioning database;
   identify the new provisioning data based on polling the provisioning database, the new provisioning data indicating data that has been added, removed, or changed in the provisioning database; and
   prepare the one or more configuration files based on the new provisioning data.

4. The provisioning manager of claim 1, wherein the one or more configuration files comprise a first configuration file prepared for a first service instance of the one or more service instances, and wherein to prepare the first configuration file, the processing circuitry is further configured to:
   determine whether to include any additional data to assist the first service instance in applying the provisioning data;
   format the configuration file according to a format that the first service instance is able to use for provisioning; and
   indicate that the first configuration file applies to the first service instance of the one or more service instances.

5. The provisioning manager of claim 1, wherein the one or more configuration files comprise a first configuration file prepared for a first service instance of the one or more service instances, and wherein to prepare the first configuration file, the processing circuitry is further configured to:
   delegate to a pluggable module customized to prepare the first configuration file based on the type of service provided by the first service instance.

6. The provisioning manager of claim 5, wherein the pluggable module has knowledge about how the provisioning data is organized in the provisioning database and is configured to use that knowledge to obtain the provisioning data relevant to the type of service provided by the first service instance.

7. The provisioning manager of claim 1, wherein at least one of the one or more configuration files indicates at least one of the following types of data:
   an identification of one or more domains;
   domain mapping information;
   an identification of one or more clients;
   mail relay configuration data; and
   mail transport configuration data.

8. The provisioning manager of claim 1, wherein at least one of the one or more configuration files comprises at least a portion of a policy related to at least one of: encrypting, quarantining, antivirus filtering, anti-spam filtering, archiving, or branding email messages.

9. A non-transitory computer readable medium storing logic that, when executed by processing circuitry of a provisioning manager, is operable to cause the provisioning manager to perform actions comprising:
   obtaining provisioning data from a provisioning database; and
   preparing one or more configuration files based on the provisioning data, the one or more configuration files indicating how to provision one or more service instances that comprise an electronic mail (email) application,
   wherein the one or more service instances correspond to one or more services,
   wherein the provisioning data comprises:
      a first policy for email communications by a first enterprise, the first policy including an encryption policy regarding encryption of electronic mail messages, and
      a second policy for email communications by a second enterprise,
   wherein:
      a first configuration file is adapted to provision a first service instance that is associated with the first enterprise according to the first policy, and
      a second configuration file is adapted to provision a second service instance that is associated with the second enterprise according to the second policy; and
   providing the one or more configuration files to the one or more service instances via file distribution technology using a version control repository,
   wherein:
      the first service instance that is associated with the first enterprise is configured to be provisioned, using the provided first configuration file, with the first policy associated with the first enterprise to implement the first policy associated with the first enterprise in association with providing a first service that corresponds to the first service instance, and
      the second service instance that is associated with the second enterprise is configured to be provisioned, using the provided second configuration file, with the second policy associated with the second enterprise to implement the second policy associated with the second enterprise in association with providing a second service that corresponds to the second service instance,
   wherein preparing the one or more configuration files includes identifying new provisioning data based on a periodic polling of the provisioning database, the periodic polling including comparing current provisioning data obtained from the provisioning database to previous provisioning data, to periodically determine added, deleted, or modified provisioning data.

10. The non-transitory computer readable medium of claim 9, wherein providing the one or more configuration files to the one or more service instances using file distribution technology comprises:
   initiating storing the one or more configuration files in one or more repositories, each of the one or more repositories configured to make at least one of the one or more configuration files available to at least one of the one or more service instances.

11. The non-transitory computer readable medium of claim 9, wherein preparing the one or more configuration files comprises:
   periodically polling the provisioning database;
   identifying the new provisioning data based on polling the provisioning database, the new provisioning data indicating data that has been added, removed, or changed in the provisioning database; and
   preparing the one or more configuration files based on the new provisioning data.

12. The non-transitory computer readable medium of claim 9, wherein the one or more configuration files comprise a first configuration file prepared for a first service instance of the one or more service instances, and wherein preparing the first configuration file comprises:
  determining whether to include any additional data to assist the first service instance in applying the provisioning data;
  formatting the configuration file according to a format that the first service instance is able to use for provisioning; and
  indicating that the first configuration file applies to the first service instance of the one or more service instances.

13. The non-transitory computer readable medium of claim 9, wherein the one or more configuration files comprise a first configuration file prepared for a first service instance of the one or more service instances, and wherein to preparing the first configuration file comprises:
  delegating to a pluggable module customized to prepare the first configuration file based on the type of service provided by the first service instance.

14. The non-transitory computer readable medium of claim 13, wherein the pluggable module has knowledge about how the provisioning data is organized in the provisioning database and is configured to use that knowledge to obtain the provisioning data relevant to the type of service provided by the first service instance.

15. The non-transitory computer readable medium of claim 9, wherein at least one of the one or more configuration files indicates at least one of the following types of data:
  an identification of one or more domains;
  domain mapping information;
  an identification of one or more clients;
  mail relay configuration data; and
  mail transport configuration data.

16. The non-transitory computer readable medium of claim 9, wherein at least one of the one or more configuration files comprises at least a portion of a policy related to at least one of: encrypting, quarantining, antivirus filtering, anti-spam filtering, archiving, or branding email messages.

17. A method, comprising:
  obtaining provisioning data from a provisioning database; and
  preparing one or more configuration files based on the provisioning data, the one or more configuration files indicating how to provision one or more service instances that comprise an electronic mail (email) application,
  wherein the one or more service instances correspond to one or more services,
  wherein the provisioning data comprises:
    a first policy for email communications by a first enterprise, the first policy including an encryption policy regarding encryption of electronic mail messages, and
    a second policy for email communications by a second enterprise,
  wherein:
    a first configuration file is adapted to provision a first service instance that is associated with the first enterprise according to the first policy, and
    a second configuration file is adapted to provision a second service instance that is associated with the second enterprise according to the second policy; and
  providing the one or more configuration files to the one or more service instances via file distribution technology using a version control repository, wherein:
    the first service instance of the one or more service instance that is associated with the first enterprise is configured to be provisioned, using the provided first configuration file, with the first policy associated with the first enterprise to implement the first policy associated with the first enterprise in association with providing a first service that corresponds to the first service instance, and
    the second service instance that is associated with the second enterprise is configured to be provisioned, using the provided second configuration file, with the second policy associated with the second enterprise to implement the second policy associated with the second enterprise in association with providing a second service that corresponds to the second service instance,
  wherein preparing the one or more configuration files includes identifying new provisioning data based on a periodic polling of the provisioning database, the periodic polling including comparing current provisioning data obtained from the provisioning database to previous provisioning data, to periodically determine added, deleted, or modified provisioning data.

18. The method of claim 17, wherein providing the one or more configuration files to the one or more service instances using file distribution technology comprises:
  initiating storing the one or more configuration files in one or more repositories, each of the one or more repositories configured to make at least one of the one or more configuration files available to at least one of the one or more service instances.

19. The method of claim 17, wherein preparing the one or more configuration files comprises:
  periodically polling the provisioning database;
  identifying the new provisioning data based on polling the provisioning database, the new provisioning data indicating data that has been added, removed, or changed in the provisioning database; and
  preparing the one or more configuration files based on the new provisioning data.

20. The method of claim 17, wherein the one or more configuration files comprise a first configuration file prepared for a first service instance of the one or more service instances, and wherein preparing the first configuration file comprises:
  determining whether to include any additional data to assist the first service instance in applying the provisioning data;
  formatting the configuration file according to a format that the first service instance is able to use for provisioning; and
  indicating that the first configuration file applies to the first service instance of the one or more service instances.

* * * * *